US011562400B1

(12) United States Patent
Xu et al.

(10) Patent No.: US 11,562,400 B1
(45) Date of Patent: Jan. 24, 2023

(54) UPLIFT MODELING

(71) Applicant: International Business Machines Corporation, Armonk, NY (US)

(72) Inventors: Jing Xu, Xi'an (CN); Si Er Han, Xi'an (CN); Xue Ying Zhang, Xi'an (CN); Steven George Barbee, Dover Plains, NY (US); Ji Hui Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/483,328

(22) Filed: Sep. 23, 2021

(51) Int. Cl.
*G06Q 30/02* (2012.01)
*G06K 9/62* (2022.01)
*G06N 20/00* (2019.01)

(52) U.S. Cl.
CPC ....... *G06Q 30/0269* (2013.01); *G06K 9/6256* (2013.01); *G06N 20/00* (2019.01); *G06Q 30/0242* (2013.01); *G06Q 30/0254* (2013.01); *G06Q 30/0277* (2013.01)

(58) Field of Classification Search
CPC ........................................ G06Q 30/0207–0277
See application file for complete search history.

(56) References Cited

U.S. PATENT DOCUMENTS

| 10,341,377 | B1* | 7/2019 | Dell'Amico | ........ | H04L 63/1433 |
| 10,699,203 | B1* | 6/2020 | Ozcaglar | .............. | G06Q 10/067 |
| 2010/0174609 | A1* | 7/2010 | Bax | ........................ | G06Q 30/08 |
| | | | | | 705/36 R |
| 2012/0059722 | A1* | 3/2012 | Rao | .................... | G06Q 30/0277 |
| | | | | | 705/14.69 |
| 2012/0158474 | A1* | 6/2012 | Fahner | ............... | G06Q 30/0211 |
| | | | | | 705/14.13 |
| 2013/0124302 | A1* | 5/2013 | Briggs | ............... | G06Q 30/0242 |
| | | | | | 705/14.44 |
| 2013/0238539 | A1* | 9/2013 | Liu | ........................ | G06N 20/00 |
| | | | | | 706/46 |
| 2014/0180848 | A1* | 6/2014 | Argue | ...................... | G07G 1/14 |
| | | | | | 705/16 |
| 2014/0214590 | A1* | 7/2014 | Argue | ................ | G06Q 30/0631 |
| | | | | | 705/26.7 |
| 2014/0358826 | A1* | 12/2014 | Traupman | .............. | G06N 7/005 |
| | | | | | 706/46 |

(Continued)

FOREIGN PATENT DOCUMENTS

| CN | 112053176 A | 12/2020 |
| CN | 112785344 A | 5/2021 |

OTHER PUBLICATIONS

Analytics Vidhya, Getting Started with Feature Engineering, Dec. 2, 2020, Internet Archive Wayback Machine from URL https://www.analyticsvidhya.com/blog/2020/10/getting-started-with-feature-engineering/, all (Year: 2020).*

(Continued)

*Primary Examiner* — Kiersten V Summers
(74) *Attorney, Agent, or Firm* — Patterson + Sheridan, LLP

(57) ABSTRACT

A method includes training a plurality of different types of machine learning models using a training dataset to produce a set of trained machine learning models and determining a lift of each trained machine learning model in the set of trained machine learning models using a validation dataset. The method also includes selecting a trained machine learning model from the set of trained machine learning models that has a highest lift of the set of trained machine learning models and predicting a likelihood that a person will perform an action by applying the selected trained machine learning model to data about the person.

16 Claims, 6 Drawing Sheets

(56) References Cited

U.S. PATENT DOCUMENTS

| | | | | |
|---|---|---|---|---|
| 2014/0372090 | A1* | 12/2014 | Lee | G06N 20/00 |
| | | | | 703/2 |
| 2016/0055320 | A1* | 2/2016 | Wang | G16H 15/00 |
| | | | | 705/2 |
| 2016/0078473 | A1* | 3/2016 | Dabbiru | H04L 67/42 |
| | | | | 705/14.44 |
| 2016/0180228 | A1* | 6/2016 | Ozbay | G06N 5/045 |
| | | | | 706/46 |
| 2016/0191334 | A1* | 6/2016 | Menkovski | H04L 43/0894 |
| | | | | 370/253 |
| 2016/0294759 | A1* | 10/2016 | Huang | H04L 51/063 |
| 2019/0340633 | A1* | 11/2019 | Mudassir | G06Q 30/0201 |
| 2020/0143414 | A1* | 5/2020 | Li | G06K 9/6257 |
| 2020/0302486 | A1 | 9/2020 | Ayoub et al. | |
| 2020/0380038 | A1* | 12/2020 | Rosset | G06F 16/313 |
| 2021/0035163 | A1* | 2/2021 | Peris | G06N 5/04 |
| 2022/0004167 | A1* | 1/2022 | Zealand | B25J 9/0006 |

OTHER PUBLICATIONS

William Koehrsen, Automated Feature Engineering in Python, Jun. 7, 2018, Internet Archive Wayback Machine from URL https://towardsdatascience.com/automated-feature-engineering-in-python-99baf11cc219?gi=a114aa95f7ac, all (Year: 2018).*

Orange Visual Programming, Feature Constructor, Oct. 27, 2020, Internet Archive Way Back Machine From URL https://orange3.readthedocs.io/projects/orange-visual-programming/en/latest/widgets/data/featureconstructor.html, all (Year: 2020).*

Rittmanmead, Importance of Feature Engineering Engineering Features, Sep. 2, 2020, Internet Archive Way Back Machine from URL https://web.archive.org/web/20200902222758/https://www.rittmanmead.com/blog/2019/02/the-importance-of-feature-engineering-and-selection/, all (Year: 2020).*

EvidenceN, How to Engineer a New Feature in Python Using Pandas, Nov. 27, 2020, Internet Archive WayBack Machine Capture from URL https://evidencen.com/how-to-engineer-a-new-feature-in-python-using-pandas/, all (Year: 2020).*

C. Manahan, "A Proportional Hazards Approach to Campaign List Selection." SAS User Group International (SUGI) 30 Proceedings. (2005).

N. J. Radcliffe "Using Control Groups to Target on Predicted Lift: Building and Assessing Uplift Models", Direct Marketing Analytics Journal, Direct Marketing Association. (2007).

V. S. Y. Lo. "The True Lift Model". ACM SIGKDD Explorations Newsletter. vol. 4 No. 2, 78-86. 1 (2002).

* cited by examiner

UPLIFT MODELING

BACKGROUND

Machine learning models are used to determine the likelihood that people will perform certain actions if a treatment were applied to those people. For example, traditional machine learning models may be used to determine the likelihood that a person will purchase a product if the person received direct marketing (e.g., a flier in the mail). The machine learning models may be applied to a group of people to determine which people in the group should receive direct marketing (P(buy|treatment)). Direct marketing may be sent to the people in the group who have the highest likelihood of making a purchase if they received direct marketing. These predictions, however, may be wasteful (e.g., wasted computing resources, paper, postage, etc.) because the predictions encompass both (1) the people who would make the purchase even if they did not receive direct marketing and (2) the people who would not have made the purchase unless they received direct marketing. The more accurate approach would be to target only the people who would not have made the purchase unless they received direct marketing (P(buy|treatment)−P(buy|no treatment)), which may be referred to as uplift model prediction.

Traditional approaches to uplift model prediction, however, are inaccurate. For example, one approach involves building two different models, one for a group that received treatment and another for another group that did not receive treatment. The likelihoods predicted by both models is then subtracted to determine lift. These two models, however, are independent, each fitting a different population, and so the difference between their predictions may not be an accurate predictor when applied to another person. This approach is especially fragile when either of the models is trained using a small sample size. Another approach involves building one model for both populations, but these approaches are locked into one model type, which may not be the best model type for different datasets for other populations.

SUMMARY

According to an embodiment, a method includes training a plurality of different types of machine learning models using a training dataset to produce a set of trained machine learning models and determining a lift of each trained machine learning model in the set of trained machine learning models using a validation dataset. The method also includes selecting a trained machine learning model from the set of trained machine learning models that has a highest lift of the set of trained machine learning models and predicting a likelihood that a person will perform an action by applying the selected trained machine learning model to data about the person. By performing this method, a computing system generates machine learning models of various types and uses the machine learning model with the greatest lift for a given dataset to make predictions about actions that a person may take.

Predicting the likelihood that the person will perform the action may include predicting a likelihood that the person will purchase an item if an advertisement about the item is communicated to the person. The method may also include communicating the advertisement to the person based on the likelihood that the person will purchase the item if the advertisement is communicated to the person.

Determining a lift of a trained machine learning model in the set of trained machine learning models may include predicting, by applying the trained machine learning model to the validation dataset, likelihoods that people represented by the validation dataset will perform the action if a treatment were applied to the people, predicting, by applying the trained machine learning model to the validation dataset, likelihoods that the people will perform the action if the treatment were not applied to the people, and for each person represented by the validation dataset, subtracting the likelihood that the respective person will perform the action if the treatment were not provided from the likelihood that the respective person will perform the action if the treatment were provided to produce a predicted difference. Determining the lift of the trained machine learning model may also include dividing the predicted differences for the people represented by the validation dataset into a plurality of deciles and calculating an average predicted difference for each decile of the plurality of deciles. The lift of the trained machine learning model may be based on the average predicted difference for a top decile of the plurality of deciles.

The training dataset and the validation dataset may represent a plurality of people and the training dataset and the validation dataset may include at least one of education levels, income levels, family sizes, or home values of the plurality of people.

The set of machine learning model types may be selected from a plurality of machine learning model types based on the data about the person.

The method may also include adjusting the training dataset by adding a feature to each datapoint in the training dataset. Each feature may be based on information in a respective datapoint in the training dataset.

The lift for a trained machine learning model may include a difference between a likelihood that a person represented by the training dataset will perform the action if a treatment were not provided from a likelihood that the person represented by the training dataset will perform the action if the treatment were provided.

According to another embodiment, an apparatus includes a memory and a hardware processor communicatively coupled to the memory. The hardware processor trains a plurality of different types of machine learning models using a training dataset to produce a set of trained machine learning models. The hardware processor also determines a lift of each trained machine learning model in the set of trained machine learning models using a validation dataset, selects a trained machine learning model from the set of trained machine learning models that has a highest lift of the set of trained machine learning models, and predicts a likelihood that a person will perform an action by applying the selected trained machine learning model to data about the person. The apparatus generates machine learning models of various types and uses the machine learning model with the greatest lift for a given dataset to make predictions about actions that a person may take.

Predicting the likelihood that the person will perform the action may include predicting a likelihood that the person will purchase an item if an advertisement about the item is communicated to the person. The hardware processor may also communicate the advertisement to the person based on the likelihood that the person will purchase the item if the advertisement is communicated to the person.

Determining a lift of a trained machine learning model in the set of trained machine learning models may include predicting, by applying the trained machine learning model to the validation dataset, likelihoods that people represented by the validation dataset will perform the action if a treatment were applied to the people, predicting, by applying the trained machine learning model to the validation dataset, likelihoods that the people will perform the action if the treatment were not applied to the people, and for each person represented by the validation dataset, subtracting the likelihood that the respective person will perform the action if the treatment were not provided from the likelihood that the respective person will perform the action if the treatment were provided to produce a predicted difference. Determining the lift of the trained machine learning model may also include dividing the predicted differences for the people represented by the validation dataset into a plurality of deciles and calculating an average predicted difference for each decile of the plurality of deciles. The lift of the trained machine learning model may be based on the average predicted difference for a top decile of the plurality of deciles.

The training dataset and the validation dataset may represent a plurality of people and the training dataset and the validation dataset may include at least one of education levels, income levels, family sizes, or home values of the plurality of people.

The set of machine learning model types may be selected from a plurality of machine learning model types based on the data about the person.

The hardware processor may also adjust the training dataset by adding a feature to each datapoint in the training dataset. Each feature may be based on information in a respective datapoint in the training dataset.

According to another embodiment, a method includes training a first machine learning model of a first selected machine learning model type using a training dataset and training a second machine learning model of a second selected machine learning model type using the training dataset. The method also includes determining a first lift of the first machine learning model using a validation dataset and determining a second lift of the second machine learning model using the validation dataset. The method further includes selecting the first machine learning model in response to determining that the first lift is greater than the second lift and predicting a likelihood that a person will perform an action by applying the first machine learning model to data about the person. By performing this method, a computing system generates machine learning models of various types and uses the machine learning model with the greatest lift for a given dataset to make predictions about actions that a person may take.

DETAILED DESCRIPTION

This disclosure describes a system that performs uplift modeling by training machine learning models of various, selected types. The system then determines a lift for each of the trained models for a given validation dataset. The system then selects one of the trained models based on its lift. The system may select the trained model with the greatest lift. The system then applies the selected model to data about a person to predict the likelihood that the person will perform an action. For example, the system may predict the likelihood that the person will purchase an item if the person received direct marketing and the likelihood that the person will purchase the item if the person does not receive direct marketing. As a result, the system trains machine learning models of various types and uses the machine learning model with the greatest lift for a given dataset to make predictions about actions that a person may take. Thus, the system performs uplift modeling using one model that is determined to be the best model for a given dataset, in certain embodiments.

Figure 1:
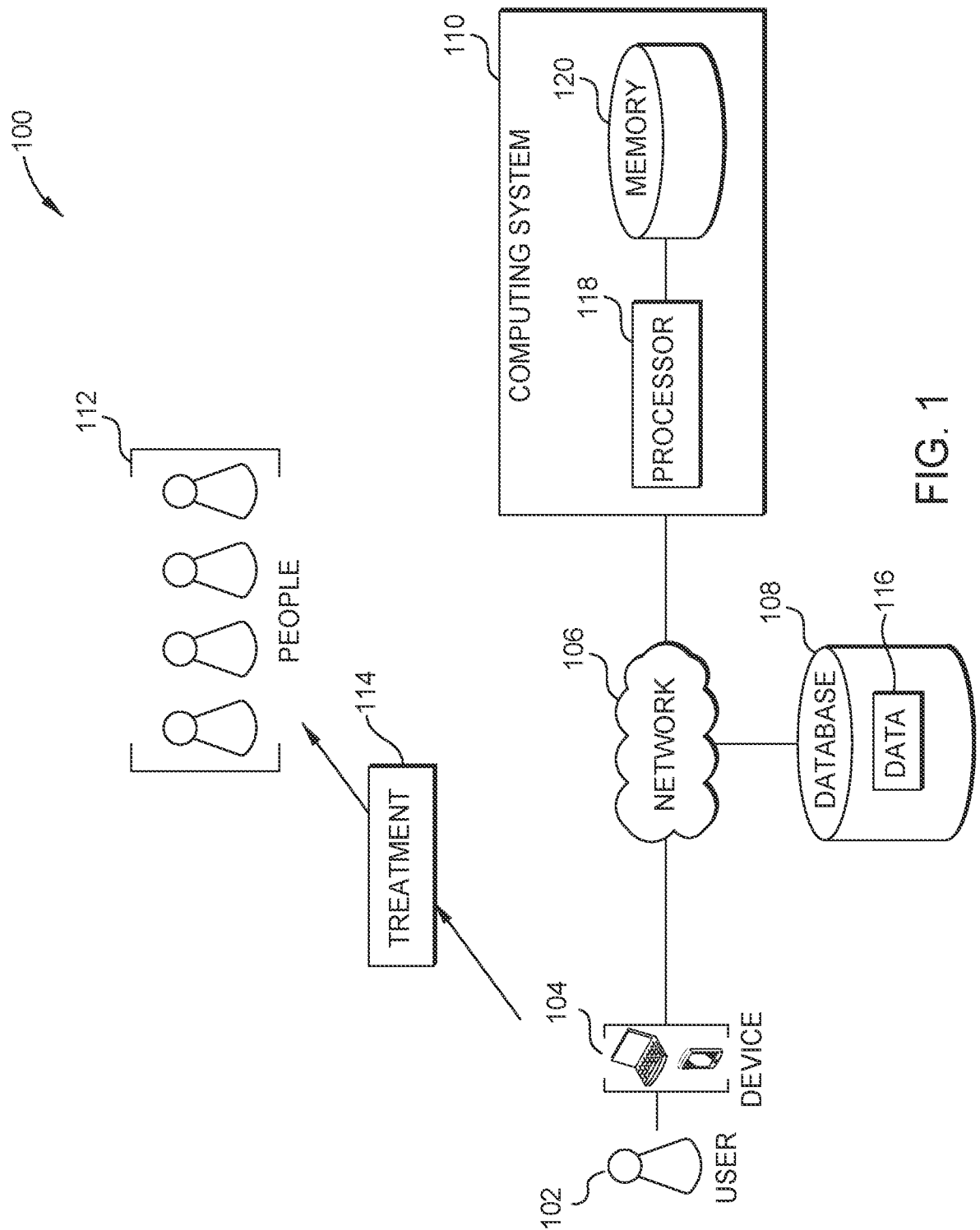
FIG. 1 illustrates an example system for uplift modeling, according to an embodiment of the present invention.

FIG. 1 illustrates an example system 100 for uplift modeling. As seen in FIG. 1, the system 100 includes one or more devices 104, a network 106, a database 108, and a computing system 110. Generally, the system 100 trains several machine learning models that predict whether a treatment should be applied to certain people. The system 100 then selects one of the machine learning models based on its lift. The system 100 then applies the selected machine learning model to information about a group of people 112 to determine if a treatment 114 should be applied to those people 112. As a result, the system 100 applies the best machine learning model for a given dataset and performs uplift modeling with that selected model, in particular embodiments.

A user 102 uses the device 104 to interact with other components of the system 100. For example, the device 104 may instruct the computing system 110 to train machine learning models and to select a machine learning model, based on its lift. The user 102 may use the device 104 to select machine learning model types for machine learning models that the computing system 110 should train and validate. In some embodiments, the machine learning model types are selected, based on the user's 102 knowledge about the data for the people 112. For example, the user 102 may know the structure of that data and the factors recorded in that data. As a result, the user 102 may select the machine learning model types that are best suited for evaluating that data. The device 104 may also receive the results of the computing system 110 applying a trained machine learning model to data about people 112. The results may indicate the people 112 who are likely to perform an action (e.g., purchase a product) if treatment were applied (e.g., sending them an advertisement for the product). In some embodiments, the device 104 receives the identities of the people 112 to which the treatment 114 should be applied.

The device 104 is any suitable device for communicating with components of the system 100 over the network 106. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user 102. The device 104 may include a hardware processor, memory, or circuitry configured to perform any of the functions or actions of the device 104 described herein. For example, a software application designed using software code may be stored in the memory and executed by the processor to perform the functions of the device 104.

The network 106 is any suitable network operable to facilitate communication between the components of the system 100. The network 106 may include any interconnecting system capable of transmitting audio, video, signals, data, messages, or any combination of the preceding. The network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The database 108 stores data 116 that is used by the computing system 110. The computing system 110 may use the data 116 to train and validate machine learning models. Additionally, the data 116 may include information about the people 112. The computing system 110 may apply a selected machine learning model to that data 116 to predict which of the people 112 should be provided the treatment 114.

The computing system 110 trains and validates machine learning models using the data 116 in the database 108. For example, the computing system 110 may receive a selection of multiple machine learning model types from the user 102 or the device 104. The computing system 110 may then train and validate machine learning models of the selected machine learning model types using the data 116 in the database 108. Each of the machine learning models may be trained to predict, based on factors about a person, a likelihood that a person will perform an action if a treatment were applied to that person and if a treatment were not applied to that person. The computing system 110 then determines a difference between these likelihoods to determine the lift of each machine learning model. The computing system 110 then selects a machine learning model from the machine learning models based on these lifts. For example, the computing system 110 may select the machine learning model with the greatest lift. The computing system 110 then applies the selected machine learning model to information about the people 112 to predict which of the people 112 should be provided the treatment 114. As seen in FIG. 1, the computing system 110 includes a processor 118 and a memory 120 that perform the functions and actions of the computing system 110 described herein.

The processor 118 is any electronic circuitry, including, but not limited to one or a combination of microprocessors, microcontrollers, application specific integrated circuits (ASIC), application specific instruction set processor (ASIP), and/or state machines, that communicatively couples to memory 120 and controls the operation of the computing system 110. The processor 118 may be 8-bit, 16-bit, 32-bit, 64-bit or of any other suitable architecture. The processor 118 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 118 may include other hardware that operates software to control and process information. The processor 118 executes software stored on the memory 120 to perform any of the functions described herein. The processor 118 controls the operation and administration of the computing system 110 by processing information (e.g., information received from the devices 104, network 106, and memory 120). The processor 118 is not limited to a single processing device and may encompass multiple processing devices.

The memory 120 may store, either permanently or temporarily, data, operational software, or other information for the processor 118. The memory 120 may include any one or a combination of volatile or non-volatile local or remote devices suitable for storing information. For example, the memory 120 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 120, a disk, a CD, or a flash drive. In particular embodiments, the software may include an application executable by the processor 118 to perform one or more of the functions described herein.

The computing system 110 applies a machine learning model to information about the people 112 to determine whether the treatment 114 should be applied to the people 112. For example, the machine learning model may be applied to information about a person 112 to predict a likelihood that that person 112 will purchase a product if that person 112 were mailed a flyer. The machine learning model may also predict a likelihood that that person 112 will purchase the product if that person 112 were not mailed the flyer. The difference between these two likelihoods is the lift for those that person 112. If the lift exceeds a threshold, then the user 102 may decide to mail the flyer to that person 112. These thresholds may be customized or set according to the needs and desires of the user 102. For example, if the user 102 has a large budget for mailing flyers, then the user 102 may set a low threshold so that more people 112 receive the flyers. If the user 102 has a smaller budget for flyers, then the user 102 may set a larger threshold so that fewer people 112 receive the flyer.

As an example operation, a user 102 may use the device 104 to select machine learning model types. The user 102 may select the machine learning model types based on the user's 102 knowledge of the data 116 representing the people 112 (e.g., knowledge about the structure or type of the data 116). For example, the user 102 may select the machine learning model types that are best suited for analyzing the data 116.

The computing system 110 receives the selections of the machine learning model types and trains machine learning models of the selected machine learning model types. The computing system 110 may divide a labeled dataset from the data 116 into a training dataset and a validation dataset. The computing system 110 then uses the training dataset to train the machine learning models of the selected, machine learning model types. For example, each machine learning model may be trained to predict, based on labeled datapoints in the training dataset, a likelihood that people will purchase an item if those people received an advertisement about the item and a likelihood that those people will purchase the item if those people did not receive the advertisement.

After the machine learning models of the selected, machine learning model types have been trained, the computing system 110 determines a cumulative lift for each machine learning model using the validation dataset by applying each machine learning model to the validation dataset. The machine learning model may apply a machine learning model to the validation dataset by applying the machine learning model to every datapoint in the validation dataset. By applying the machine learning model to a datapoint in the validation dataset, the computing system 110 predicts a likelihood that a person represented by that datapoint will purchase the item if that person received an advertisement and a likelihood that that person will purchase the item if that person did not receive an advertisement. The computing system 110 then subtracts these two likelihoods to determine a lift for that datapoint. This process repeats until the computing system 110 has determined a lift for every datapoint of the validation dataset using the machine learning model.

The computing system 110 then orders and deciles the lifts for the validation dataset. The computing system 110 then sums or averages the top decile of lifts to determine the cumulative lift for the machine learning model. The computing system 110 then repeats this process for the other machine learning models to determine the cumulative lifts for those machine learning models. After the cumulative lifts are determined, the computing system 110 selects the machine learning model with the greatest cumulative lift.

The computing system 110 then applies the selected machine learning model to the data 116 that includes information about the people 112 to predict a lift for each person 112. These lifts are then used to determine whether the treatment 114 should be applied to certain people 112. For example, if a lift for a person 112 exceeds a threshold lift, then the person 112 is likely to purchase the item if an advertisement is sent to that person 112. As a result, the user 102 may send the advertisement to that person 112. If a lift for a person 112 does not exceed the threshold lift, then an advertisement is not likely to change that person's 112 mind about purchasing the item. As a result, the user 102 may not send the advertisement to that person 112. The user 102 may adjust the threshold lift according to any suitable parameter. For example, the user 102 may lower the threshold lift so that more advertisements are sent if the user 102 has a large advertising budget. On the other hand, the user 102 may increase the threshold lift so that fewer advertisements are sent if the user 102 has a small advertising budget.

Figure 2A:
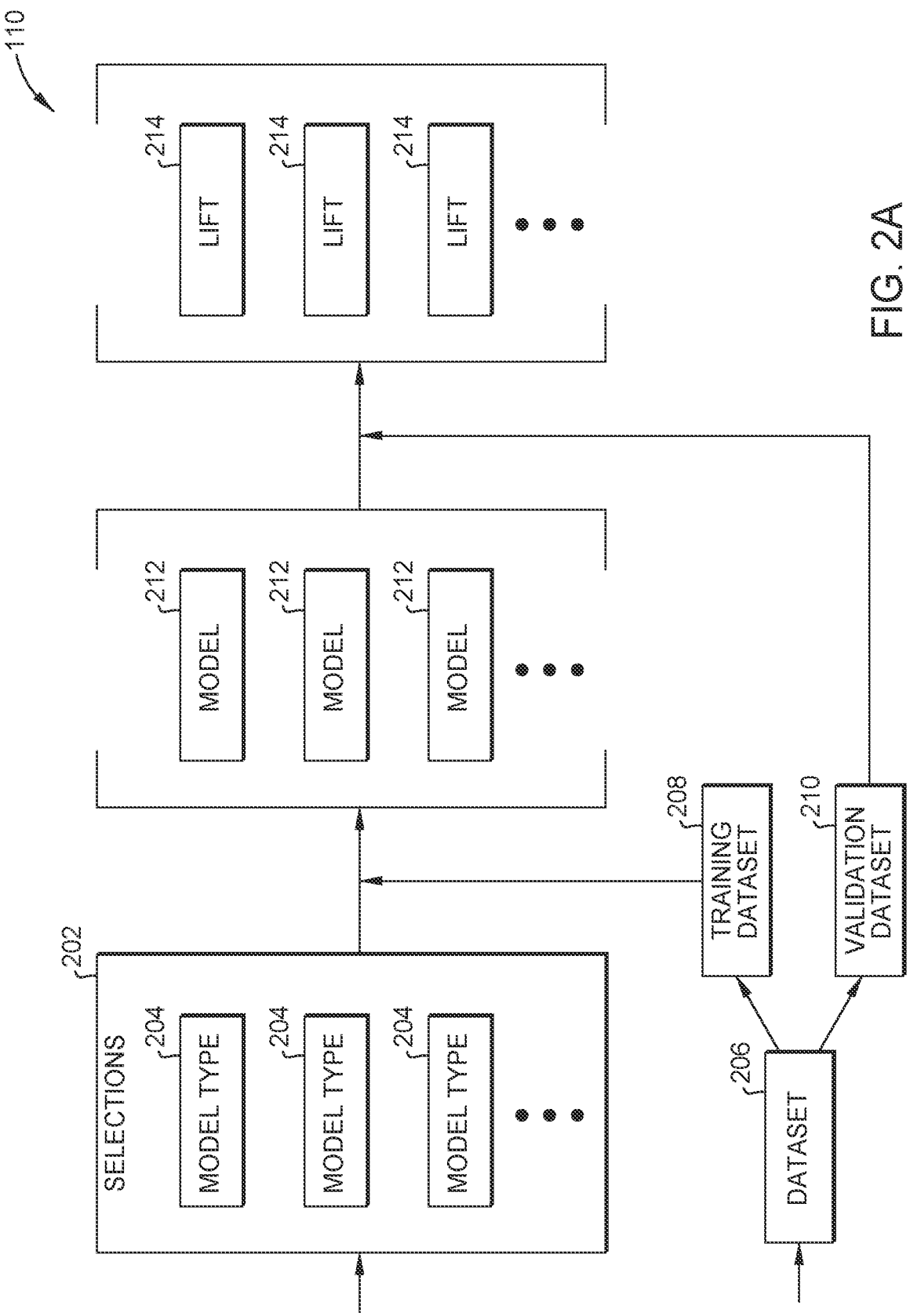
FIGS. 2A and 2B illustrate example operations of a computing system in the system of FIG. 1.

FIG. 2A illustrates an example operation of the computing system 110 in the system 100 of FIG. 1. As seen in FIG. 2A, the computing system 110 receives selections of multiple machine learning model types, and then trains and validates machine learning models of those selected machine learning model types. The computing system 110 then computes a lift for each of the trained machine learning models.

The computing system 110 receives selections 202 of machine learning model types 204. The selections 202 may include any suitable number of selected different machine learning model types 204. The user 102 using the device 104 may have selected the machine learning model types 204 based on the user's 102 knowledge of the dataset to be evaluated to predict which people should receive treatment. For example, the user 102 may have selected the machine learning model types 204 because machine learning models of those types 204 may be best suited for evaluating data of a particular structure or type. After the user 102 makes the selections 202, the device 104 communicates the selections 202 to the computing system 110.

The computing system 110 retrieves a dataset 206 from the database 108. The dataset 206 may be part of the data 116 illustrated in FIG. 1 and may be used to train and validate machine learning models. The dataset 206 may include labeled data that teaches the machine learning model the correct predictions for a given set of factors. Given enough datapoints in the dataset 206, a machine learning model may be trained to make accurate predictions based on those factors. The computing system 110 divides the dataset 206 into a training dataset 208 and a validation dataset 210. For example, the computing system 110 may assign 85% of the datapoints in the dataset 206 to the training dataset 208 and 15% of the datapoints in the dataset 206 to the validation dataset 210. The computing system 110 then uses the datapoints in the training dataset 208 to train machine learning models and the datapoints in the validation dataset 210 to validate those trained models.

The computing system 110 trains machine learning models 212 using the training dataset 208. The trained machine learning models 212 have the selected machine learning model types 204. For example, if the model types 204 included a Bayesian model type, a discriminant model type, a tree model type, and a quest model type, then the computing system 110 trains a Bayesian model 212, a discriminant model 212, a tree model 212, and a quest model 212 using the training dataset 208. The training may include using the label in each datapoint in the training dataset 208 to teach a model 212 what the correct prediction is for a given set of factors. When enough labeled datapoints are used to train the model 212, the model 212 may detect patterns or trends in the factors that result in the particular predictions.

After training the models 212, the computing system 110 validates the models 212. For example, the computing system 110 may apply each model 212 to the datapoints of the validation dataset 210. The models 212 may make predictions based on the factors in those datapoints. These predictions are then used to determine a lift 214 for each model 212. The lifts 214 may then be evaluated to determine which model 212 should be selected for use.

In particular embodiments, the computing system 110 applies a model 212 to the validation dataset 210 to make two predictions per datapoint in the validation dataset 210. First, the model 212 predicts a likelihood that a person represented by that datapoint will perform an action if a treatment were applied to that person. The model 212 then predicts a likelihood that the person will perform the action if no treatment were applied to that person. The computing system 110 then determines a lift by subtracting these two likelihoods. The computing system 110 may apply the model 212 to every datapoint in the validation dataset 210 in this manner to determine a lift for each datapoint. The computing system 110 then adds or averages the lifts to determine a cumulative lift 214 for that model 212. The computing system 110 then repeats this process for each trained model 212 to determine a cumulative lift 214 for each trained model 212. These cumulative lifts 214 are then evaluated to determine which model 212 should be selected for use.

In some embodiments, the computing system 110 determines the cumulative lift 214 for a model 212 based on a subset of the lifts for that model 212. For example, the computing system 110 may apply the model 212 to every datapoint in the validation dataset 210 to determine a lift for every datapoint in the validation dataset 210. The computing system 110 then orders (e.g., increasing or decreasing order) and deciles the ordered lifts (e.g., divides the lifts into top 10%, second 10%, third 10%, and so on). The computing system 110 then sums or averages a number of deciles of the lifts to determine the cumulative lift 214. For example, the computing system 110 may sum or average the top 10% of the lifts to determine the cumulative lift 214 for the model 212.

Figure 2B:
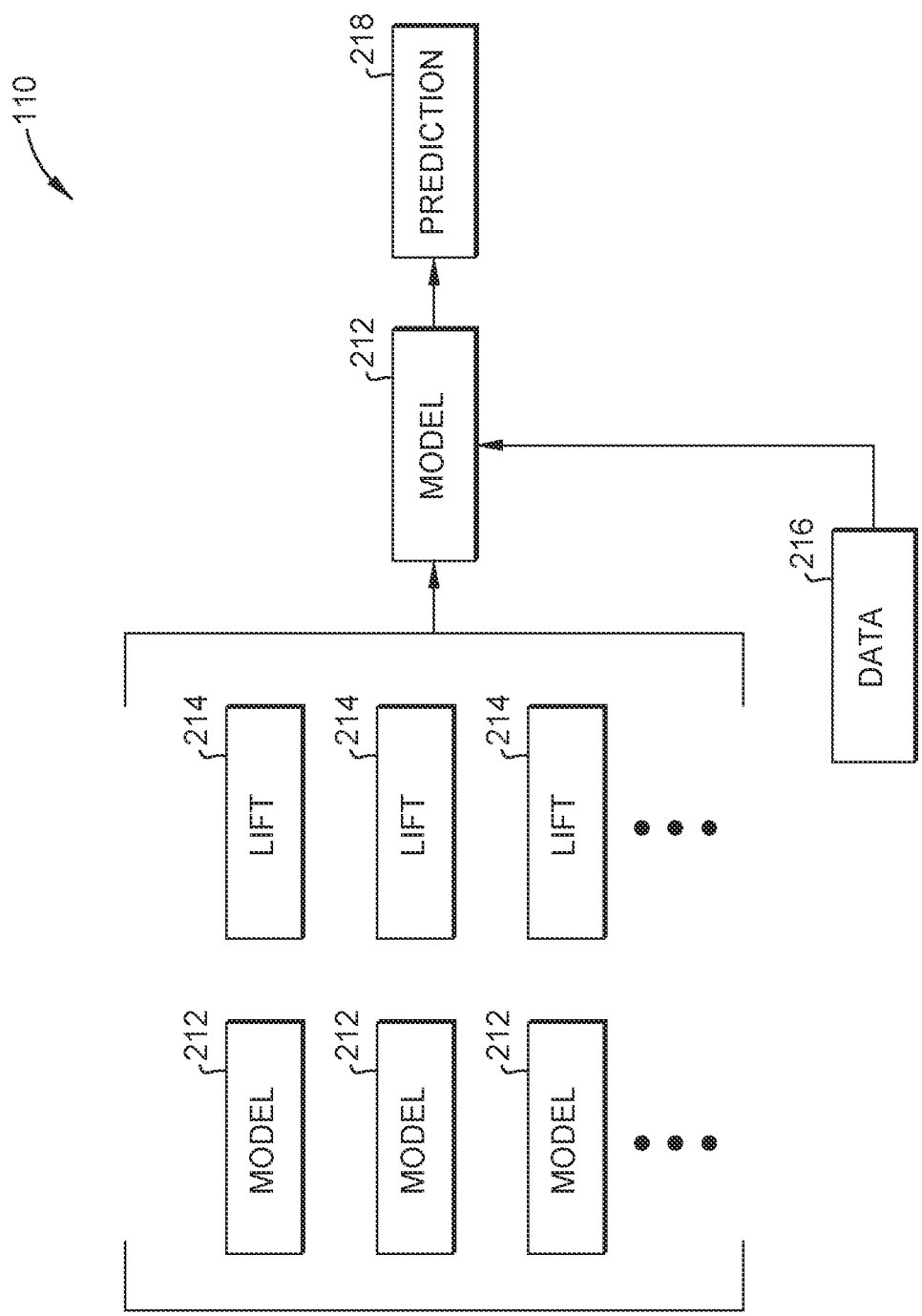

FIG. 2B illustrates an example operation of the computing system 110 in the system 100 of FIG. 1. The operation in FIG. 2B may be performed after the operation in FIG. 2A. As seen in FIG. 2B, the computing system 110 has determined the cumulative lift 214 for each trained model 212. The computing system 110 then selects a model 212 from the trained models 212 based on their cumulative lifts 214. In some embodiments, the computing system 110 selects the model 212 that has the greatest cumulative lift 214. The computing system 110 may select any model 212 using any criteria based on the cumulative lifts 214.

After selecting the model 212, the computing system 110 applies the model 212 to data 216 from the database 108. The data 216 may be part of the data 116 (shown in FIG. 1) and may include datapoints representing the people 112 (shown in FIG. 1). The data 216 may not be labeled. The computing system 110 then applies the model 212 to the data 216 to predict for each person 112 a likelihood that that person 112 will perform an action if treatment were applied and a likelihood that that person 112 will perform the action if treatment were not applied. The computing system 110 may subtract these two likelihoods to determine a lift for that person 112. The computing system 110 may apply the model 212 to every datapoint in the data 216 to determine a lift for each person 112 represented by the datapoints in the data 216. The model 212 then produces a prediction 218. The prediction 218 may include the lifts that were predicted for each person 112 based on the data 216. In some embodiments, the computing system 110 compares those lifts to thresholds to determine which people 112 should receive treatment. The prediction 218 may identify those people 112 that should receive the treatment. For example, the prediction 218 may identify the people 112 that have a lift that is greater than a lift threshold.

Figure 3:
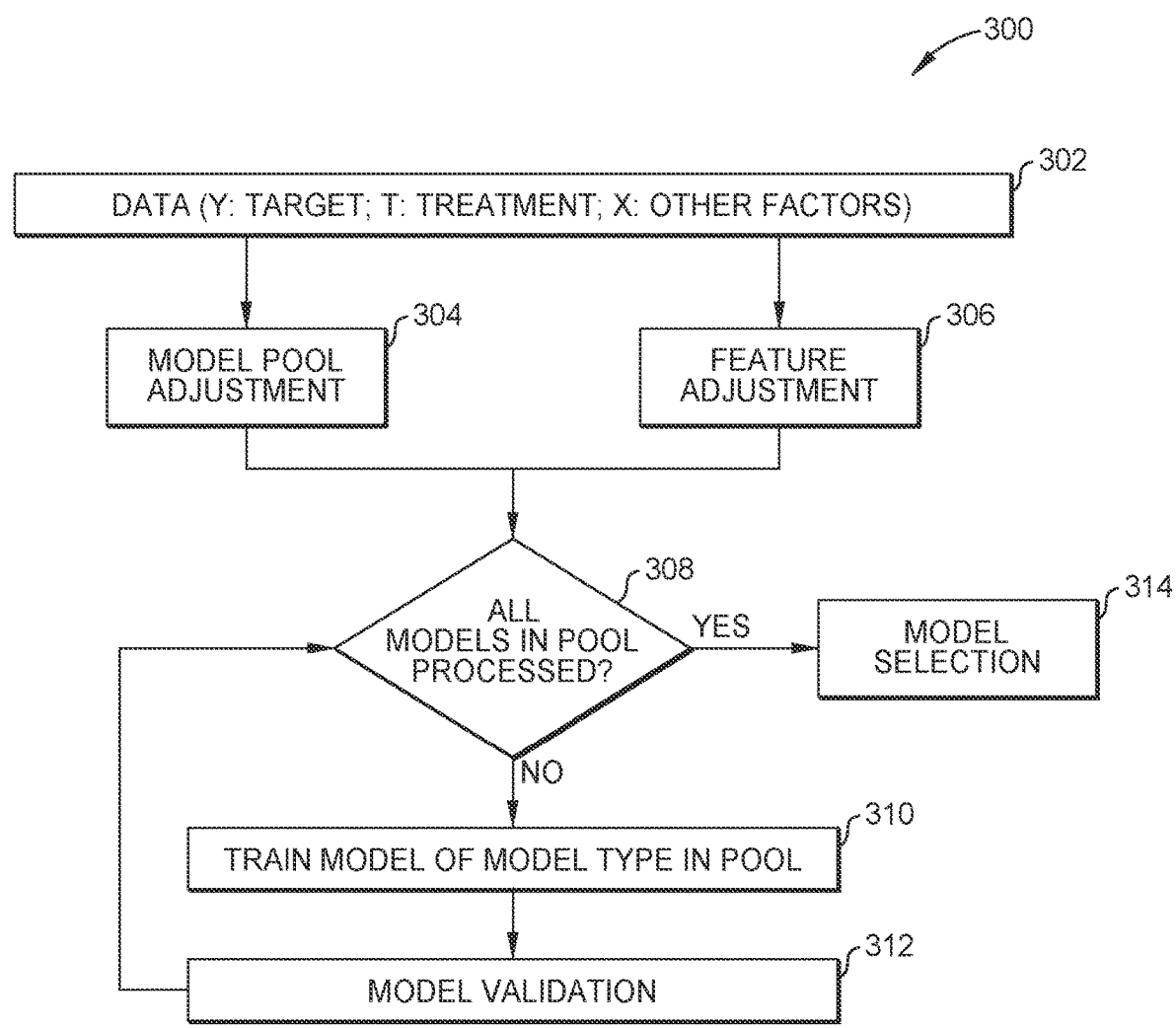
FIG. 3 illustrates an example operation performed in the system of FIG. 1.

FIG. 3 illustrates an example operation 300 performed in the system 100 of FIG. 1. The operation 300 begins with the computing system 110 receiving the data 302. The data 302 may be labeled datapoints that includes information about people. For example, each datapoint may include information about a person, such as T (indicating whether treatment was applied to that person) and X (indicating factors or information about that person) and a label Y (indicating whether that person took an action). X may include any suitable information about the person (e.g., age, income level, family size, education level, home value, etc.). In some embodiments, Y may include a likelihood or probability that the person takes the action.

The computing system 110 performs model pool adjustment in block 304. Model pool adjustment includes the computing system 110 receiving the selections 202 of the model types 204. A user 102 may have selected the model types 204 based on knowledge of the data to be evaluated. The computing system 110 receives these selections 202 and adjusts the pool of machine learning models to be trained based on the selected model types 204. For example, if a certain model type was not selected, then the computing system 110 removes that model type from the pool. As a result, the model pool includes machine learning models of the selected machine learning model types 204.

The computing system 110 performs feature adjustment in block 306. During feature adjustment, the computing system 110 may adjust the data 302, so that the data 302 may be better structured to train machine learning models. For example, the computing system 110 may create another factor in each datapoint of the data 302 by multiplying the factors X by the treatment T. As a result, each datapoint in the data 302 is expanded with an additional factor (XT).

The computing system 110 then begins training machine learning models of the machine learning model types 204 in the model pool. In block 308, the computing system 110 determines whether all models in the pool have been processed or trained. If there are machine learning model types 204 left in the model pool to be trained, then the computing system 110 proceeds to block 310 to train a machine learning model of a model type 204 in the pool. As discussed previously, the computing system 110 uses a training dataset 208 that includes labeled data to train the machine learning model. In the example of FIG. 3, the data 302 may be divided into the training dataset 208 and the validation dataset 210. The machine learning model is trained using the data 302 that is in the training dataset 208. The machine learning model analyzes the datapoints in the training dataset 208 to determine which X and T impact the likelihood that a person will take an action. Using this analysis, the machine learning model is trained to predict the likelihood that a person will perform an action if treatment were applied and the likelihood that the person will perform the action if the treatment were not applied.

The computing system 110 then validates the trained machine learning model in block 312. The datapoints in the data 302 that were not assigned to the training dataset 208 are assigned to a validation dataset 210. The computing system 110 uses the validation dataset 210 to validate the trained machine learning model. For example, the computing system 110 may apply the trained machine learning model to the validation dataset 210 to predict for each datapoint in the validation dataset 210 a likelihood that a person represented by that datapoint will perform an action if treatment were applied and a likelihood that the person will perform the action, if the treatment were not applied. The computing system 110 then subtracts these two likelihoods to determine a lift for the datapoint. The computing system 110 adds or averages the lifts for every datapoint in the validation dataset 210 to determine a cumulative lift 214 for the machine learning model. The computing system 110 then returns to block 308 to determine, if another machine learning model type remains in the pool for training.

In some embodiments, the computing system 110 orders the lifts (e.g., in increasing or decreasing order) for a machine learning model and then deciles the ordered lifts (e.g., top 10%, second 10%, third 10%, and so on). The computing system 110 then sums or averages some of the deciles of the ordered lifts (e.g., the top decile of lifts) to determine the cumulative lift 214. In certain embodiments, the computing system 110 may subtract a baseline lift from the summed or averaged lifts to determine the cumulative lift 214. The baseline lift may be a value indicating the lift resulting from not applying any machine learning model and instead, applying treatment randomly to the people 112.

After the computing system 110 has trained and validated a machine learning model of every machine learning model type 204 in the model pool, the computing system 110 selects one of the machine learning models in block 314. The computing system 110 may select a machine learning model based on its cumulative lift 214 (e.g., the machine learning model with the greatest cumulative lift 214).

Figure 4:
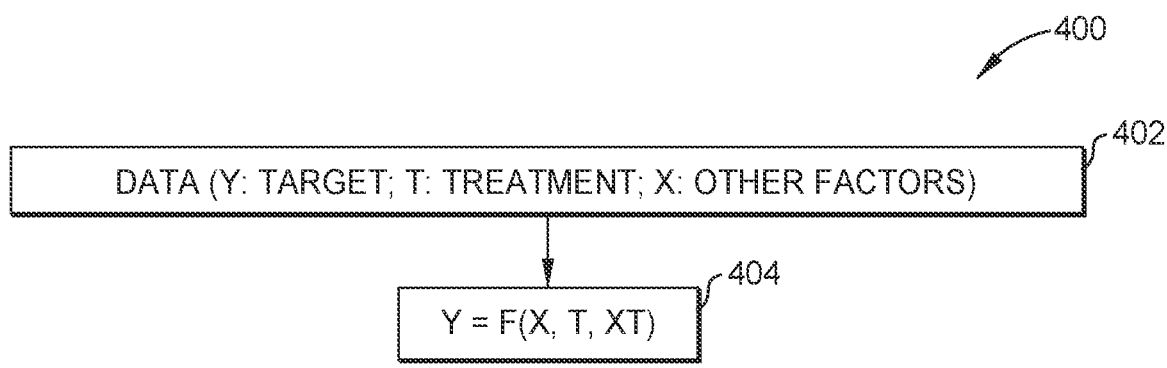
FIG. 4 illustrates an example operation performed in the system of FIG. 1.

FIG. 4 illustrates an example operation 400 performed in the system 100 of FIG. 1. Specifically, the computing system 110 performs the operation 400 to perform feature adjustment. As seen in FIG. 4, the computing system 110 receives the data 402 that includes the target Y, the treatment T, and other factors X. The computing system 110 then performs feature adjustment in block 404. During feature adjustment, the computing system 110 creates another factor (e.g., the product of X and T). In this manner, the computing system 110 expands the data 402 to include other factors that may produce better trained machine learning models.

Figure 5:
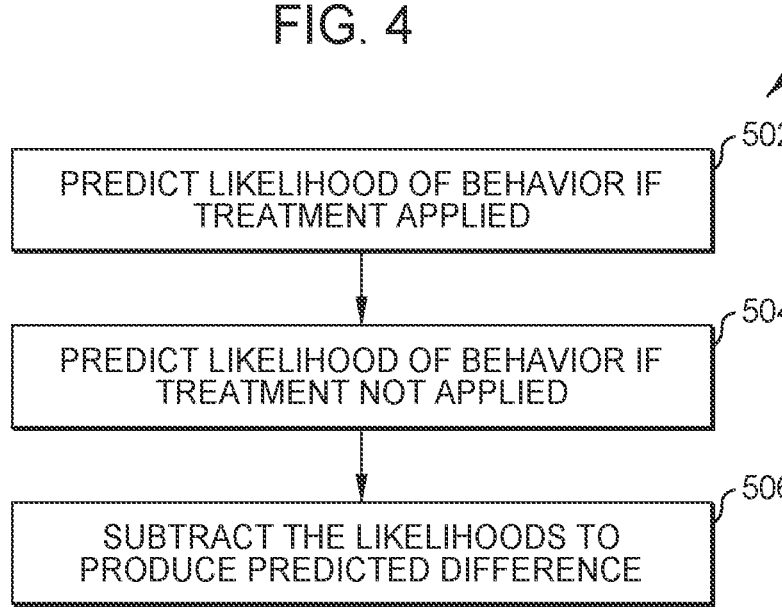
FIG. 5 illustrates an example operation performed in the system of FIG. 1.

FIG. 5 illustrates an example operation 500 performed in the system 100 of FIG. 1. In particular embodiments, the computing system 110 performs the operation 500. By performing the operation 500, the computing system 110 performs model validation (e.g., the model validation performed in block 312 of FIG. 3).

In block 502, the computing system 110 predicts a likelihood of behavior if treatment were applied. The computing system 110 may apply a trained machine learning model to a datapoint in a validation dataset to predict whether a person represented by that datapoint will engage in particular behavior if treatment were applied.

In block 504, the computing system 110 predicts a likelihood of behavior if treatment were not applied. For example, the computing system 110 may apply the machine learning model to the datapoint in the validation dataset 210 to predict a likelihood that the person represented by the datapoint will engage in the behavior if the treatment was not applied.

In block 506, the computing system 110 subtracts the likelihoods determined in blocks 502 and 504 to produce a predicted difference. This difference is the predicted lift for the datapoint in the validation dataset 210. The computing system 110 may repeat the operation 500 for every datapoint in the validation dataset 210 to determine a predicted lift for every datapoint in the validation data set 210.

Figure 6:
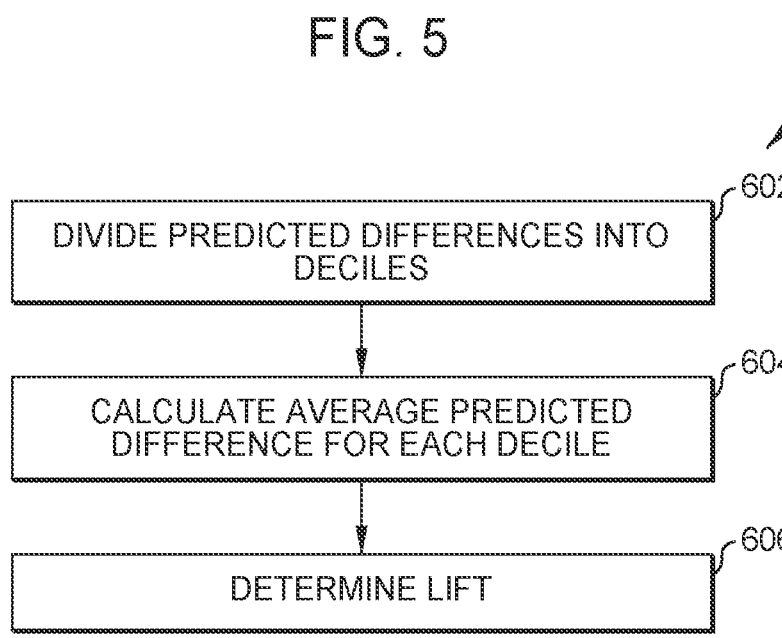
FIG. 6 illustrates an example operation performed in the system of FIG. 1.

FIG. 6 illustrates an example operation 600 performed in the system 100 of FIG. 1. In particular embodiments, the computing system 110 performs the operation 600. By performing the operation 600, the computing system 110 determines a cumulative lift for a machine learning model (e.g., during model selection in block 314 of FIG. 3).

In block 602, the computing system 110 divides predicted differences into deciles. For example, the computing system 110 may divide into deciles the predicted differences determined for the datapoints in the validation dataset 210 and for a machine learning model. The computing system 110 may order the predicted differences based on their magnitudes and then decile the ordered, predicted differences. In block 604, the computing system 110 calculates an average predicted difference for each decile. For example, the computing system 110 may sum the predicted differences in a decile and then divide that sum by the number of predicted differences in the decile to determine the average predicted difference for that decile.

In block 606, the computing system 110 determines a lift for the machine learning model using the average predicted differences determined in block 604. The computing system 110 may determine the lift based on the average predicted difference for the top decile. In some embodiments, the computing system 100 subtracts the average predicted difference for the top decile and the lift predicted for random sampling. Random sampling may refer to the predicted lift from not applying any machine learning model to the validation dataset 210 and instead, applying treatment randomly to the people represented by the validation dataset. Subtracting the lift of the top decile and the lift of random sampling may produce the cumulative lift of the machine learning model. The computing system 110 may subsequently compare the cumulative lifts of the machine learning models of the different machine learning model types, and select the machine learning model with the greatest cumulative lift. The computing system 110 may then apply the selected machine learning model to data to predict the lifts for people 112 represented by the data. A user 102, device 104, or the computing system 110 may then determine which of the people 112 should receive treatment based on the determined lifts. For example, if a person 112 has a lift that exceeds a lift threshold, then treatment should be applied to that person 112.

Figure 7:
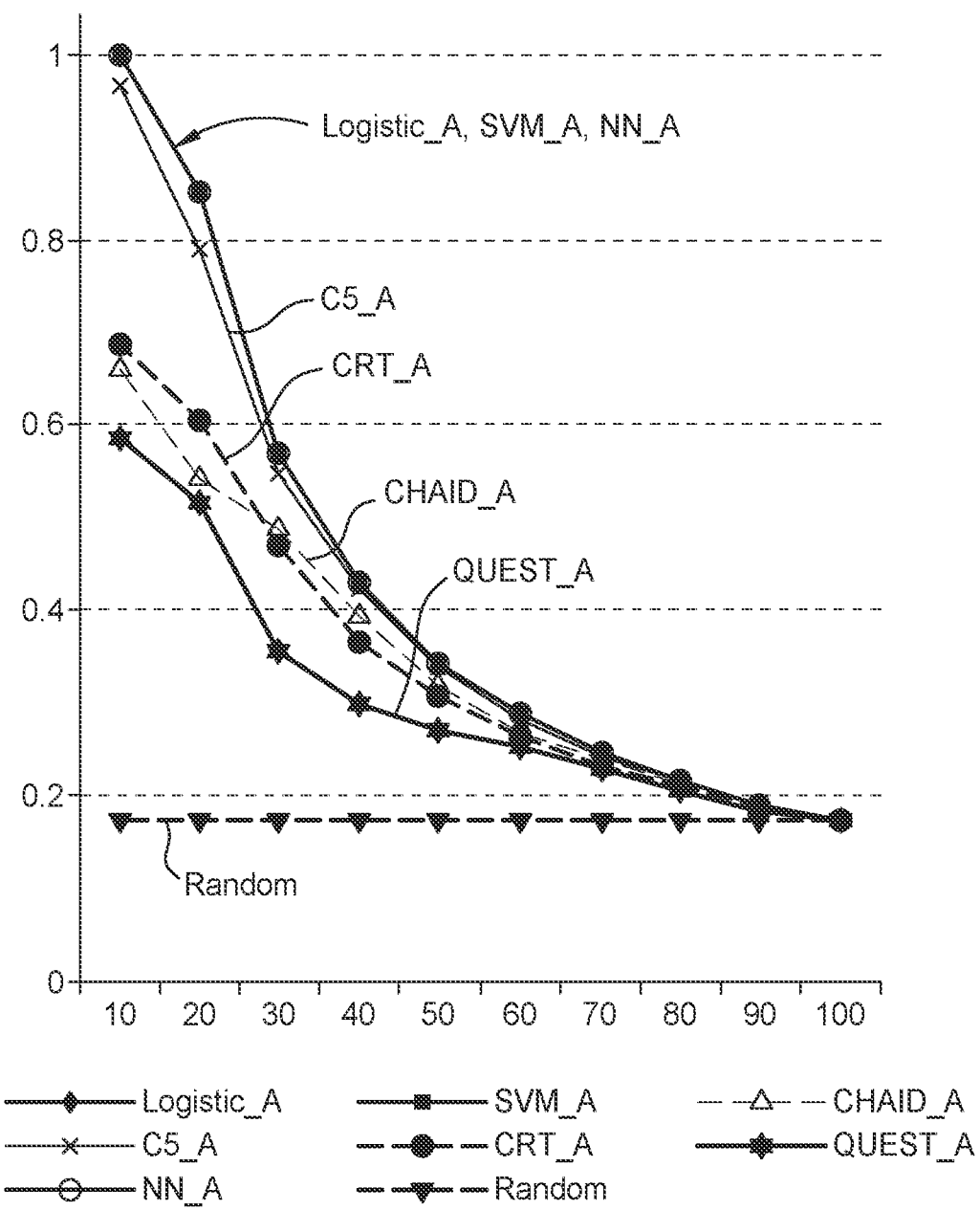
FIG. 7 illustrates an example result generated using the system of FIG. 1.

FIG. 7 illustrates an example result generated using the system of FIG. 1. The chart in FIG. 7 shows the lift of different types of machine learning models (e.g., Logistic_A, SVM_A, CHAID_A, C5_A, CRT_A, QUEST_A, and NN_A) cumulative across deciles. Additionally, the chart shows the lift provided by random sampling, which serves as a baseline against which the machine learning models are compared. As seen in FIG. 7, for the top decile, Logistic_A, SVM_A, and NN_A provide the greatest lift relative to random sampling. Thus, the computing system 110 may select any of these three machine learning models to apply to data for people 112.

In summary, a computing system 110 performs uplift modeling by training machine learning models of various, selected types. The computing system 110 then determines a lift for each of the trained models for a given validation dataset. The computing system 110 then selects one of the trained models based on its lift. The computing system 110 may select the trained model with the greatest lift. The computing system 110 then applies the selected model to data about a person 112 to predict the likelihood that the person 112 will perform an action if treatment were applied and if treatment were not applied. For example, the computing system 110 may predict the likelihood that the person will purchase an item if the person received direct marketing and the likelihood that the person will purchase the item if the person does not receive direct marketing. These likelihoods are then used to determine a lift for that person 112. As a result, the computing system 110 trains machine learning models of various types and uses the machine learning model with the greatest lift for a given dataset to make predictions about actions that a person 112 may take. Thus, the computing system 110 performs uplift modeling using one model that is determined to be the best model for a given dataset, in certain embodiments The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access the computing system 110 or the database 108 in the cloud. Doing so allows a user to access information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
    receiving a selection of a plurality of different machine learning model types, wherein the plurality of different machine learning model types were selected based on demographic data about a person;
    adjusting a training dataset by adding a first feature to each datapoint in the training dataset, wherein each first feature is a multiplicative product of (i) another feature in the respective datapoint to which the first feature was added and (ii) an indicator whether a treatment was applied;
    training, using the adjusted training dataset, a plurality of machine learning models of the plurality of different machine learning model types to produce a set of trained machine learning models;
    determining a lift of each trained machine learning model in the set of trained machine learning models using a validation dataset;
    selecting a trained machine learning model from the set of trained machine learning models that has a highest lift of the set of trained machine learning models; and
    predicting a likelihood that the person will perform an action by applying the selected trained machine learning model to the demographic data about the person.

2. The method of claim 1, wherein predicting the likelihood that the person will perform the action comprises predicting a likelihood that the person will purchase an item if an advertisement about the item is communicated to the person.

3. The method of claim 2, further comprising communicating the advertisement to the person based on the likelihood that the person will purchase the item if the advertisement is communicated to the person.

4. The method of claim 1, wherein determining a lift of a trained machine learning model in the set of trained machine learning models comprises:
    predicting, by applying the trained machine learning model to the validation dataset, likelihoods that people represented by the validation dataset will perform the action if a treatment were applied to the people;
    predicting, by applying the trained machine learning model to the validation dataset, likelihoods that the people will perform the action if the treatment were not applied to the people; and
    for each person represented by the validation dataset, subtracting the likelihood that the respective person will perform the action if the treatment were not provided from the likelihood that the respective person will perform the action if the treatment were provided to produce a predicted difference.

5. The method of claim 4, wherein determining the lift of the trained machine learning model further comprises:
    dividing the predicted differences for the people represented by the validation dataset into a plurality of deciles; and
    calculating an average predicted difference for each decile of the plurality of deciles.

6. The method of claim 5, wherein the lift of the trained machine learning model is based on the average predicted difference for a top decile of the plurality of deciles.

7. The method of claim 1, wherein the training dataset and the validation dataset represent a plurality of people and wherein the training dataset and the validation dataset includes at least one of education levels, income levels, family sizes, or home values of the plurality of people.

8. The method of claim 1, wherein the lift for a trained machine learning model comprises a difference between a likelihood that a person represented by the training dataset will perform the action if a treatment were not provided from a likelihood that the person represented by the training dataset will perform the action if the treatment were provided.

9. An apparatus comprising:
    a memory; and
    a hardware processor communicatively coupled to the memory, the hardware processor configured to:
        receive a selection of a plurality of different machine learning model types, wherein the plurality of different machine learning model types were selected based on demographic data about a person;
        adjust a training dataset by adding a first feature to each datapoint in the training dataset, wherein each first feature is a multiplicative product of (i) another feature in the respective datapoint to which the first feature was added and (ii) an indicator whether a treatment was applied;
        train, using the adjusted training dataset, a plurality of machine learning models of the plurality of different machine learning model types to produce a set of trained machine learning models;
        determine a lift of each trained machine learning model in the set of trained machine learning models using a validation dataset;

select a trained machine learning model from the set of trained machine learning models that has a highest lift of the set of trained machine learning models; and predict a likelihood that the person will perform an action by applying the selected trained machine learning model to the demographic data about the person.

10. The apparatus of claim 9, wherein predicting the likelihood that the person will perform the action comprises predicting a likelihood that the person will purchase an item if an advertisement about the item is communicated to the person.

11. The apparatus of claim 10, the hardware processor further configured to communicate the advertisement to the person based on the likelihood that the person will purchase the item if the advertisement is communicated to the person.

12. The apparatus of claim 9, wherein determining a lift of a trained machine learning model in the set of trained machine learning models comprises:

predicting, by applying the trained machine learning model to the validation dataset, likelihoods that people represented by the validation dataset will perform the action if a treatment were applied to the people;

predicting, by applying the trained machine learning model to the validation dataset, likelihoods that the people will perform the action if the treatment were not applied to the people; and for each person represented by the validation dataset, subtracting the likelihood that the respective person will perform the action if the treatment were not provided from the likelihood that the respective person will perform the action if the treatment were provided to produce a predicted difference.

13. The apparatus of claim 12, wherein determining the lift of the trained machine learning model further comprises:

dividing the predicted differences for the people represented by the validation dataset into a plurality of deciles; and calculating an average predicted difference for each decile of the plurality of deciles.

14. The apparatus of claim 13, wherein the lift of the trained machine learning model is based on the average predicted difference for a top decile of the plurality of deciles.

15. The apparatus of claim 9, wherein the training dataset and the validation dataset represent a plurality of people and wherein the training dataset and the validation dataset includes at least one of education levels, income levels, family sizes, or home values of the plurality of people.

16. A method comprising:

receiving a selection of a first machine learning model type and a second machine learning model type, wherein the first and second machine learning model types were selected based on demographic data about a person;

adjusting a training dataset by adding a first feature to each datapoint in the training dataset, wherein each first feature is a multiplicative product of (i) another feature in the respective datapoint to which the first feature was added and (ii) an indicator whether a treatment was applied;

training a first machine learning model of the first machine learning model type using the training dataset;

training a second machine learning model of the second machine learning model type using the training dataset;

determining a first lift of the first machine learning model using a validation dataset;

determining a second lift of the second machine learning model using the validation dataset;

selecting the first machine learning model in response to determining that the first lift is greater than the second lift; and predicting a likelihood that a person will perform an action by applying the first machine learning model to data about the person.

* * * * *